United States Patent
Goldman et al.

(10) Patent No.: US 11,975,269 B2
(45) Date of Patent: May 7, 2024

(54) SYSTEM AND METHOD FOR VIDEO GAME MATCHMAKING WITH MATCH AUTHENTICATION

(71) Applicant: Double Shot LLC, Bellevue, KY (US)

(72) Inventors: Jared Michael Goldman, Bellevue, KY (US); Troy James Davis, Cincinnati, OH (US)

(73) Assignee: DOUBLE SHOT LLC, Bellevue, KY (US)

( * ) Notice: Subject to any disclaimer, the term of this patent is extended or adjusted under 35 U.S.C. 154(b) by 218 days.

(21) Appl. No.: 17/712,926

(22) Filed: Apr. 4, 2022

(65) Prior Publication Data

US 2022/0314126 A1    Oct. 6, 2022

Related U.S. Application Data

(60) Provisional application No. 63/170,022, filed on Apr. 2, 2021.

(51) Int. Cl.
*A63F 13/00* (2014.01)
*A63F 13/71* (2014.01)
*A63F 13/795* (2014.01)

(52) U.S. Cl.
CPC ............ *A63F 13/795* (2014.09); *A63F 13/71* (2014.09)

(58) Field of Classification Search
CPC ........ A63F 13/79; A63F 13/30; A63F 13/335; A63F 13/798; A63F 13/77; A63F 13/332; A63F 13/73; A63F 2300/558; A63F 2300/406
See application file for complete search history.

(56) References Cited

U.S. PATENT DOCUMENTS

| | | | |
|---|---|---|---|
| 2009/0098932 A1* | 4/2009 | Longway | G07F 17/322 463/22 |
| 2012/0122552 A1* | 5/2012 | Youm | A63F 13/77 463/23 |
| 2017/0266564 A1* | 9/2017 | Choudhuri | A63F 13/335 |

\* cited by examiner

*Primary Examiner* — David L Lewis
*Assistant Examiner* — Eric M Thomas
(74) *Attorney, Agent, or Firm* — Dinsmore & Shohl LLP

(57) ABSTRACT

A video game matchmaking and match authentication system is configured to interact with a third party game software and game server to supplement or replace that third party's matchmaking process. The system builds a player profile and unique player signature for each player based upon their performance within a game, and based upon the raw player inputs received from a game controller. The player signature indicates the player's skill within a particular game or game genre, and also provides a unique representation of the player's expected performance, skill, and raw inputs for future matches within that game or game genre. Matchmaking is player driven to provide a desired match experience, and player skill matching occurs based on the player signatures. Monitoring and authentication occurs during the match and is based on analysis of raw inputs and match events to identify irregularities that suggest intentional manipulation.

15 Claims, 6 Drawing Sheets

SYSTEM AND METHOD FOR VIDEO GAME MATCHMAKING WITH MATCH AUTHENTICATION

FIELD

This application claims priority to U.S. Provisional Patent 63/170,022, filed Apr. 2, 2021, titled "Player Confidence Systems and Methods" of which is hereby incorporated herein by reference in its entirety.

BACKGROUND

Conventional video game matchmaking techniques include randomized player matching, queue-based matching (e.g., players will be matched or added into a match based on the order that they queued or requested to join), experienced based matching (e.g., based on overall time spent playing the game, based on the number of matches previously played), geographical matching (e.g., matching players based on proximity, to reduce latency), and other factors.

While conventional video game matchmaking techniques are generally adequate for casual players, there are a number of shortcomings that become apparent for professional and/or highly competitive game players. As an example, unless a player identifies specific other players to join a match with (e.g., based on a friends list), they will have no control over the type of match that results, and will be subject to the intentions of the game's built-in matchmaking process (e.g., randomized matchmaking, experience based matchmaking). This can result in players of vastly different skill being placed into the same match, or players of essentially identical skill being placed into the same match, but in any case there is no clear indication of relative skill level or other criteria on which the match was based. For professional and highly competitive players, this makes it very challenging to create certain desired match experiences, and also provides little insight as to the match experience provided by a particular match (e.g., a player will have no idea how skilled another player is until some time is spent in the match).

A further challenge for professional and highly competitive players, especially prevalent in competitive gaming scenarios where certain prizes, prestige, or opportunities are available based upon game results (e.g., cash prizes, leaderboard rankings, advancement in a competitive tournament), is fraudulent player activity that is intended to provide an advantage over other players, or to manipulate matchmaking processes in order to allow a highly skilled player to compete against low skill players. While conventional video games often include programming to detect and prevent software manipulation (e.g., player automation by "bots"), there are other activities that are undetectable. As an example, this might include where a highly skilled player participates in competitive gaming activities using an account of a low skilled player and is matched with other low skilled players, where a group of players all play using a single account in order to "farm" score or points for a leaderboard ranking, where a player uses an external device or controller to provide a competitive advantage (e.g., such as by using a keyboard and mouse in a match where other players are using handheld controllers, or using a handheld controller that is capable of performing automated inputs based upon pre-configured macros), or even where a low skill player hands a game controller to a nearby highly skilled player during the middle of an ongoing match. With games increasingly occurring entirely remotely, and often without audio or visual feeds of players, these and other activities are typically impossible to detect, and can unduly influence the outcome of professional, highly competitive, and prize-based gaming activities.

What is needed, therefore, is an improved system for video game matchmaking.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

Figure 1:
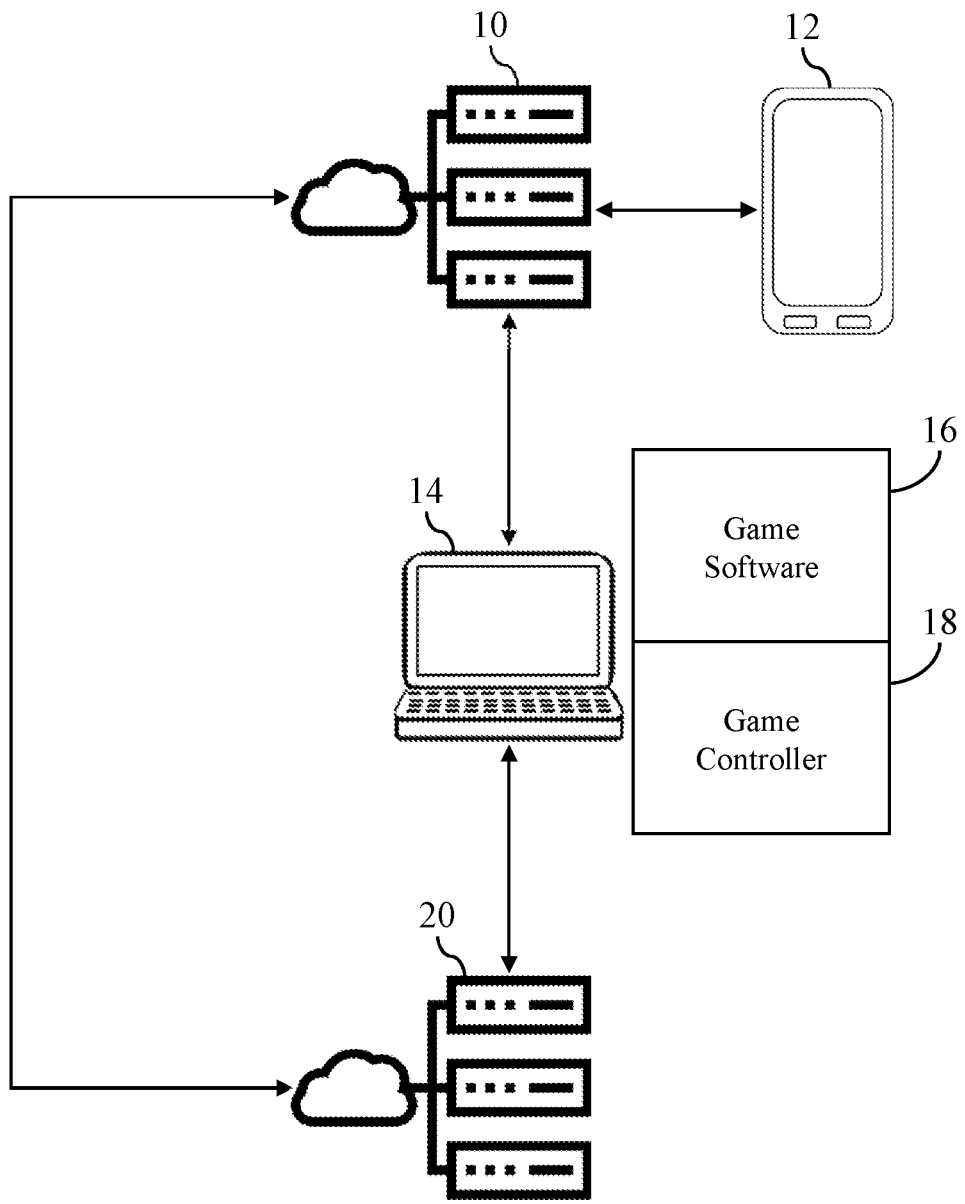
FIG. 1 is a schematic diagram of an exemplary system configured to provide video game matchmaking with match authentication.

The inventors have conceived of novel technology that, for the purpose of illustration, is disclosed herein as applied in the context of video game matchmaking. While the disclosed applications of the inventors' technology satisfy a long-felt but unmet need in the art of video game matchmaking, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Varying implementations of the disclosed technology provide player directed matchmaking (e.g., to allow a player to choose a particular experience—such as playing a more skilled opponent, a less skilled opponent, or an equally skilled opponent), improved visibility for matchmaking (e.g., players will be aware of relative skill levels), interfaces and features for staking or pooling points, currency, digital assets, or other prizes on the results of the match, and authentication features to identify and prevent player fraud during the match (e.g., such as using non-standard game controllers that provide a competitive advantage, or where a highly skilled player plays under the account of a low skilled player, etc.).

In some implementations, the matchmaking features are provided to a third party's game software or game server (e.g., using an application programming interface or other software interface) in order to replace or supplement pre-existing or default matchmaking features. This allows for a consistent set of matchmaking features and a consistent matchmaking experience to be provided across a plurality of different games, and also allows for player activity in one game to influence matchmaking in other games (e.g., a player's activity establishing a certain skill level in one game may influence the player's initial presumed skill in similar games, player attempts to manipulate the results of one game may influence the detection of attempts to manipulate a different game, etc.), and a player's profile, configuration, preferences, and other aspects to be applied to matchmaking in other games.

As an additional advantage, implementations of the disclosed technology may be configured to perform advanced detection of player attempts to manipulate a match or matchmaking features. While conventional game software and game servers perform some basic detection of player attempts to cheat or manipulate a match, such detection processes are game specific and tend to only identify the most blatant manipulations (e.g., such as software modifications or extensions added into the game software itself), and provide little or no visibility for certain attempts at manipulation (e.g., such as use of a non-standard game controller or other user interface device, or sharing of accounts between players of vastly different skill).

To address these shortcomings, implementations of the disclosed technology are configured to collect player data over time (e.g., player skill data, such as match results and match history, but also input data, such as the particular inputs provided by a player via a game controller or other input device, as well as the time between inputs, order of inputs, type of inputs, etc.) and perform advanced analytics functions with the data (e.g., such as a pre-configured expert module, trained machine learning module, or other configured analytics module) to identify patterns of inputs or player activity that are irregular (e.g., a player vastly increasing in skill from one match to another, speed and precision of player inputs substantially increasing during a short period of time) or impossible (e.g., such as where inputs to the game are physically impossible with the expected game controller, including mutually exclusive inputs being received at substantially the same moment in time).

In such implementations, when an irregular or impossible pattern of activity is identified, some or all of the players involved in the match may be warned or notified of the irregularity, may be required to re-authenticate their identity or hardware profile, or the entire match may be paused and/or terminated, with any distribution or assignment of points, ranking, currency, digital assets, or other prizes being reversed or terminated.

As further example of the above, FIG. 1 is a schematic diagram of an exemplary system configured to provide video game matchmaking with match authentication. A matchmaking server (10) is configured to provide matchmaking and match authentication, and is in communication with a user device (12) (e.g., a smartphone, tablet, laptop computer), a game device (14) (e.g., a personal computer, game console, and other computing devices that may be configured to operate game software), and a game server (20). When used herein, a server should be understood to include one or more physical, virtual, or cloud servers or other computing environments. When referenced herein, servers, user devices, game devices, and other computing device should be understood to include some or all of processors, memories, storage devices, communication devices, displays, user interface devices, and other components. Communication between devices (e.g., such as between the game server (20) and the matchmaking server (10), or the matchmaking server (10) and the game device (14)) may be performed over the internet or another network, and may performed via a software application, application programming interface (API), webservice, or other communication channel or interface.

The game server (20) may be a third party server environment that is associated with one or more multiplayer game software applications that may be played simultaneously by multiple players within a match. The game server (20) is configured to facilitate aspects of the multiplayer match, and may include player account management, player history and statistics, configurations and aspects of matches, matchmaking, and coordination of match characteristics between players (e.g., positions of players relative to each other, match score or other state, etc.). In some implementations, aspect of the multiplayer match may instead be handled peer-to-peer by game devices (14) of one or more players, such as where the game server (20) manages the players account and match history, but match characteristics and timing are handled peer-to-peer. In implementations where the game server (20) is configured to provide matchmaking, the matchmaking features of the matchmaking server (10) may replace or supplement the matchmaking provided by the game server (20).

The user device (12) may be configured to communicate with the matchmaking server (10) via a native software application or web browser and web-based portal, and may be configured to allow a user to change configurations on the matchmaking server (10), submit commands and other inputs to the matchmaking server (10), and participate in authentication features of the matchmaking server (10).

The game device (14) may be configured to operate game software (16) that is installed on the game device (14) as a native software application, browser based software application, or cloud based software application, and may be configured to receive inputs for games via a connected game controller (18) (e.g., a handheld controller, keyboard, mouse, joystick, motion controller, etc.).

When providing matchmaking, the matchmaking server (10) is configured to interface with components of a third party game platform (e.g., the game software (16) executed by the game device (14), the game server (20), or both) in order to replace or supplement pre-existing matchmaking features, which may include replacing or supplementing an underlying matchmaking algorithm, matchmaking user interfaces and graphical displays, and other features. In this manner, the matchmaking server (10) may provide the same or similar features to a plurality of different games and game servers (20), and may be readily implemented for particular game servers (20) or game software (16) (e.g., using an API, or a software package or library provided by an administrator of the matchmaking server (10) and included in the game software (16) or game server (20)). Additionally, for causal players and other players that do not have user accounts for the matchmaking server (10), or prefer to disable features of the matchmaking server (10), the experience of the game software (16) and/or game server (20) can readily be returned to its default state (e.g., by not calling or triggering the API).

Figure 2:
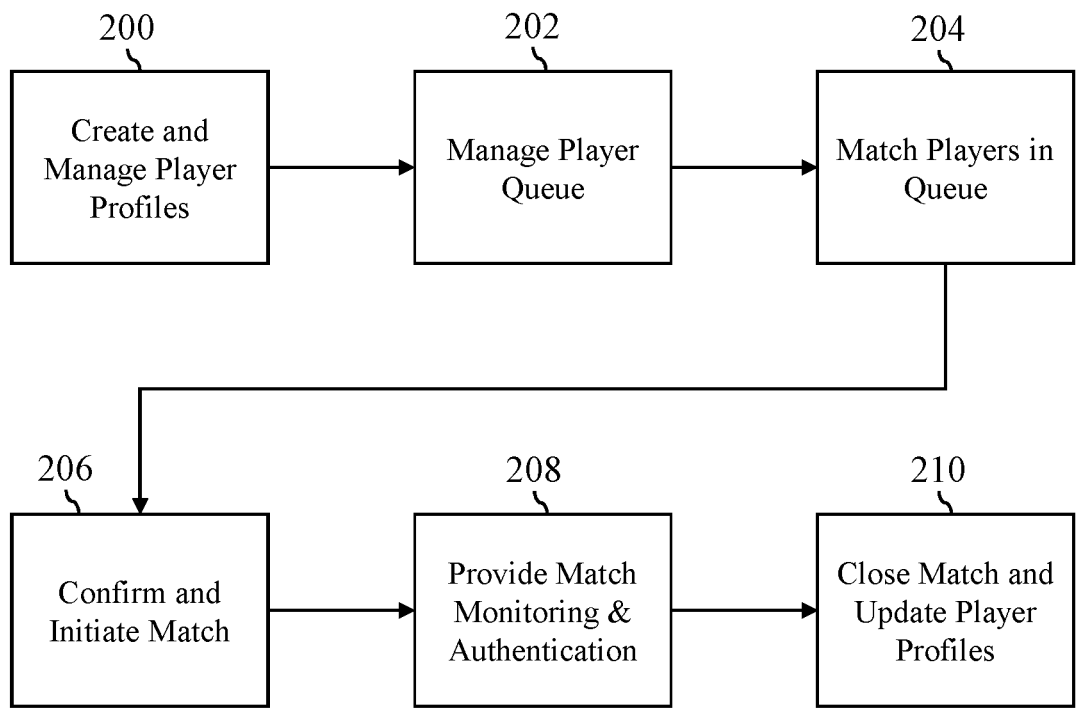
FIG. 2 is a flowchart of a set of high-level steps that could be performed with a system to provide video game matchmaking with match authentication.

FIG. 2 is a flowchart of a set of high-level steps that could be performed with a system, such as that disclosed in FIG. 1, to provide video game matchmaking with match authentication. The system may create (200) and manage player profiles over time, which may include storing player preferences and configurations, player matchmaking history, player skill history (e.g., for specific games, genres of games, or globally), player input history (e.g., inputs received from game controllers (18) and game devices (14) used by the player, including type and timing of game controller (18) inputs, and type, network latency, internet protocol address (IP address), IP address geolocation, etc.), and any player restrictions, such as might result from attempts to manipulate matchmaking or match results, or as might result from a players own self-configured limitations on match play time, match results (e.g., to limit excessive losses in score, points, currency, or digital assets), and other limitations. In some implementations, the player profile includes a player signature that is derived from the preceding information, and that provides an abstracted description of the player's historical skill and habits for a particular game or game genre, or globally.

The player signature is configured to be used by a matchmaking function (e.g., as an indicator of player skill), and is also configured to be used by one or more match authentication functions (e.g., such as an expert module, machine learning module, or other analytics module configured to identify irregularities in current match data based on a player's historic skill, game controller (18) inputs, and other characteristics). In some implementations, the system may also determine a team signature for different subsets of players based on cooperative play between those players and/or the individual player signatures of those players. Team signatures may be used similarly to player signatures, and may be substituted for player signatures for matchmaking purposes when those players are matchmaking for cooperative play versus other players or other teams. This is advantageous as it accounts for players whose individual skill level varies substantially from their skill level with one or more other players that they frequently play with, and so might elevate a team of individually low skill players to matchmaking as highly skilled players, or vice versa.

The system may also manage (202) a player queue and match (204) players within the player queue. When entering the queue, players may specify certain desired match experience characteristics, such as match experience type, match competition level, and other characteristics that are usable to match the player with other players that are queued for a compatible match experience. Once matched (204), the system may confirm (206) and initiate the match, which may include providing a pre-match interface (e.g., via the game software (16), game server (20), user device (12)) that is configured to introduce the match and/or allow the matched players to confirm and initiate the match. In varying implementations the pre-match interface may allow the matched players to converse via audio or typed text, to view aspects of other players' player profile and/or player signature, to confirm that they are prepared for the match to begin, and to submit points, score, currency, or digital assets into a match pool that will be distributed based on the match results.

After the match begins, the system may provide (208) match monitoring and authentication, which may include receiving information from the game server (20) and one or more game devices (14). As has been described, received information may be used to update and manage player profiles and player signatures, to determine match results and distribute a match pool, to authenticate player identify and prevent manipulation of the matchmaking function, to authenticate game controller (18) function and prevent manipulation, and to provide a historic dataset of match activity that may be reviewed or analyzed at a later time based upon newly configured expert modules, machine learning modules, or other analytics modules to identify previously hidden manipulation.

Once a match is completed, the system may close (210) the match, which may include using match information to update player profiles and signatures, using match information to distribute a match pool, using match information to update configurations of authentication functions (e.g., by adding annotated match data into training datasets for machine learning modules configured to authenticate player identity or game controller (18) manipulation), and may also include applying and enforcing one or more player matchmaking limitations upon players that have been flagged for manipulation, or that have self-configured limitations on match time, match losses, or other characteristics.

Figure 3:
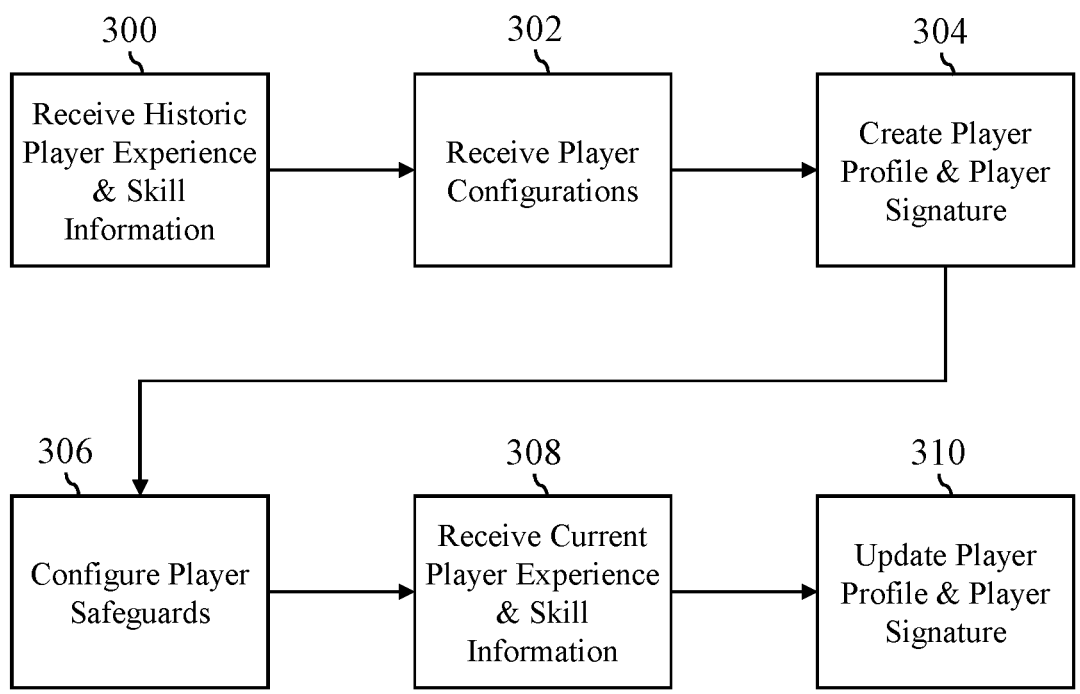
FIG. 3 is a flowchart of a set of steps that could be performed with a system to create and manage player profiles for matchmaking and match authentication.

While examples have been provided above, FIG. 3 provides additional examples of steps that could be performed with a system to create and manage player profiles for matchmaking and match authentication. The system may receive (300) historic player experience and skill information from the game server (20), game device (14), or both, which may include a players activities within a particular game, game genre, or globally occurring before the player created an account on the matchmaking server (10). The system may also receive (302) player defined configurations that may indicate the players own self-evaluated skill level, desired game experience types (e.g., a preference to play other players of lesser, great, or equivalent skill), desired competition levels (e.g., whether and to what extent the player will submit points, score, currency, digital assets, or other prizes for a match pool), and any self-configured limitations that the player will be subject to (e.g., total number of matches or match time per week, total number of match losses per time period, total amount of match pool submissions lost).

The system may then create (304) the player's initial player profile and player signature, and may configure (306) one or more safeguards for matchmaking with the player (e.g., to enforce limitations on match time, losses, etc.). A player's initial profile and signature may largely rely on the received (300) historic data, but will be managed and modified (310) over time based on received (308) current player experience and skill information, such as may be received (300) from each monitored match that the player participates in after creating (304) their profile and signature. In some implementations, the system may monitor and receive (308) current information associated with a new player during non-competitive matches, or during matches that are initiated specifically to benchmark the player and establish their player signature, and player-driven matchmaking may only become available to the player after a certain minimum threshold of player profile data and confidence in player signature is achieved.

Figure 4:
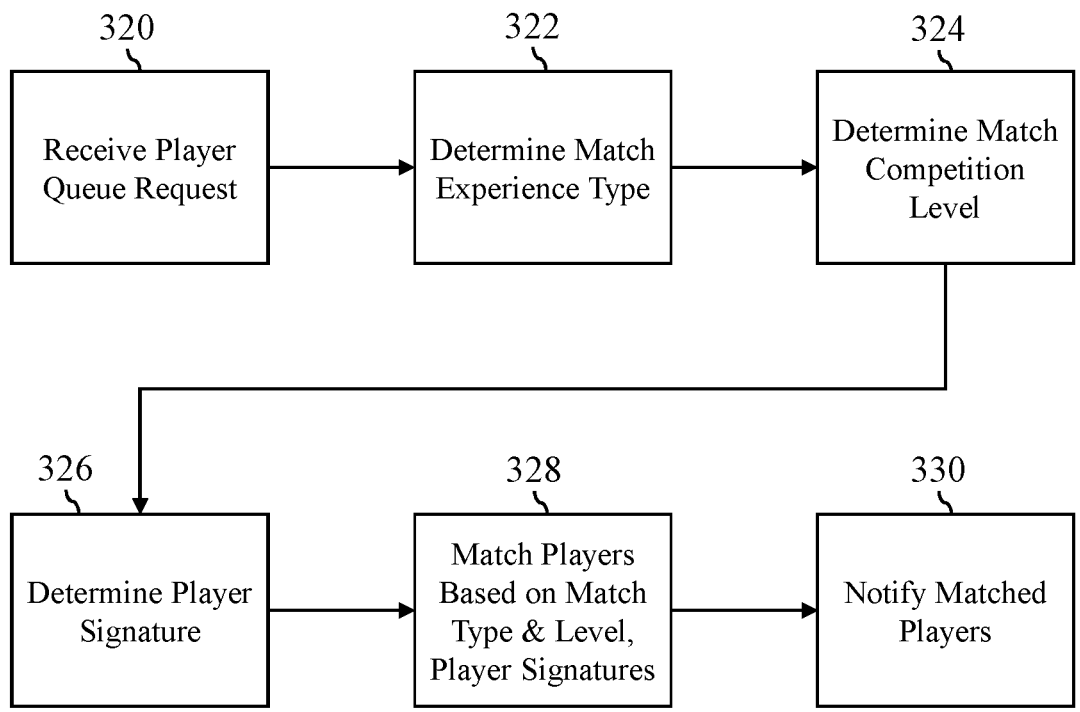
FIG. 4 is a flowchart of a set of steps that could be performed with a system to manage a player queue and provide matchmaking.

While examples have been provided above, FIG. 4 provides additional examples of steps that could be performed with a system to manage a player queue and provide matchmaking. The system may receive (320) player queue requests for a particular game, which may include the identity of the player (e.g., an account identifier for the matchmaking server (10) and/or game server (20)), and other player selected configurations for the type of match that is desired. Player queue requests may be received (320) via a queuing interface that is provided to players via the game device (14), user device (12), or both.

The system may determine (322) the desired match experience type based on the request, which may include determining whether the player desires to compete with other players having more skill, less skill, or equivalent skill, and may also include a desired magnitude of the skill variance (e.g., this may be expressed as a quantitative metric such as 10% or 30% more skilled, or may be expressed as a raw difference in score or rating derived from the player signature).

The system may also determine (324) a desired match competition level based on the request, which may include determining whether the player desires to compete purely for the sake of experience or for bragging rights, or whether the player desires to compete for a match pool collectively submitted by the players and/or the matchmaking server (10), and if competition for a match pool is desired the magnitude of risk that the player desires (e.g., a limit on score, rating, or currency that the player is willing to submit to the match pool, or a rarity or type of digital asset that the player is willing to submit to the match pool).

The system may then determine (326) the player's signature based upon the most recently updated version of the player's profile, and may attempt to match (328) two or more queued players whose queue request is compatible into a single match based on their desired match experience type, desired match competition level, and player signature. This matchmaking function (328) may be performed by an expert module, machine learning module, or other appropriately configured analytics module that is capable of interpreting and relativizing multiple player signatures. Once matched (328), the system may notify (330) the matched players that a match has been found, which may include a notification or message provided via the user device (12) or game device (14).

Figure 5:
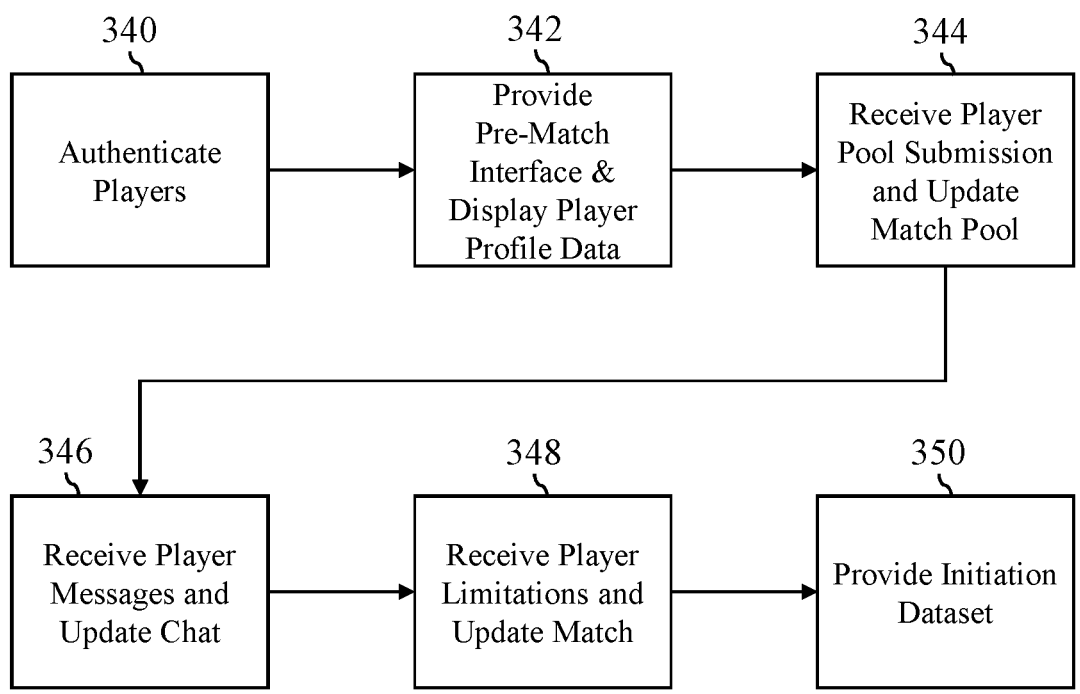
FIG. 5 is a flowchart of a set of steps that could be performed with a system to confirm and initiate a match.

While examples have been provided above, FIG. 5 provides additional examples of steps that could be performed with a system to confirm and initiate a match. When initiating a match, the system may authenticate (340) each player associated with the match, which may include receiving information from the player's game device (14), user device (12), or both. As an example, this may include receiving a player password or code, or a biometric input (e.g., via a facial recognition, voice recognition, or fingerprint recognition feature of the user device (12) or game device (14)).

This may also include a two factor authentication process, whereby the matchmaking server (20) provides a unique code or clickable prompt that appears only on a single user device (12) associated with the player (e.g., uniquely associated by a MAC address, phone number, or user session) and/or a single game device (14) associated with the player (e.g., similarly uniquely associated). In some implementations, the matchmaking server (20) may also ensure that both the game device (14) and user device (12) are connected to the same local network (e.g., such as a home Wi-Fi network), or are within local proximity of each other (e.g., such as by a Wi-Fi direct, Bluetooth, or other short proximity wireless communication between the devices). This unique code or clickable prompt must be returned to the matchmaking server and/or interacted with in order to complete authentication (340). Such a feature prevents player account sharing with other remote players, and also increases the difficulty of locally sharing accounts between players (e.g., by providing a single user device (12) and game device (14) which each must be present and immediately available to respond).

Once matched players are authenticated (340), the system may provide (342) a pre-match interface to each player via their user device (12), game device (14), or both. The pre-match interface may display portions of each players profile data (e.g., name, skill or experience level, historic scores, ratings, or leaderboards, etc.). The pre-match interface may be configured to receive (344) submission from payers for a match pool, and will update and display the match pool and any required or available actions for each player as submissions are received. In some implementations, the system may require a certain balance of received (344) player pool submissions based on each player's relative skill level, and may display via the pre-match interface the current pool balance and the required pool balance. As an example, where a player of skill level 100 is matched to a player of skill level 90, the system may require that any pool submission made by the level 90 player be matched by the level 100 player and exceeded by 33% (e.g., or other percentage or raw amount) to account for the acknowledged skill difference between the players. In this example, where the level 90 player submits three rare digital assets to the match pool, the pre-match interface may update the pool to display those three rare digital assets, and may prompt the level 100 player to submit four rare digital assets before the match pool is balanced.

The pre-match interface may also allow the players to communicate with each other by video, audio, or text chat, and received (346) communications will be distributed to other players participating in the pre-match interface. In some implementations, this may include providing a video chat interface whereby each player sees an image of the other, and may also include displaying a profile image of the player that is associated with their player profile so that the players can verify each other as the true owner/player of the matched accounts. In some implementations, the pre-match interface may also be configured to receive (348) player configured limitations from one or both players. Such configured limitations may be pre-configured as available benefits or detriments that alter the match state in some way, either to equalize players of varying skill, or to further misbalance the players. Continuing the above example, the level 100 player may select an option via the pre-match interface to cause the level 90 player to begin the match with additional points, resources, items, or other beneficial conditions. Additional limitations may be entirely for entertainment, or may offset variances in the affected player's pool submission requirements, so after selecting such an option the level 100 player is only required to submit 3 rare digital assets to the match pool instead of 4.

Once all players have performed any actions required by the pre-match interface and/or clicked a button to indicate that they are ready for the match to begin, the system may close the pre-match interface and provide (350) a match initiation dataset to the game server (20) and/or game software (16) to cause the match to begin. The match initiation dataset may include the unique account identifiers of the players, any selected match characteristics (e.g., game level, game type, victory conditions, etc.), any configured player limitations or benefits (348), and other information required by the game server (20) and/or game software (16) to start and conduct the match. In some implementations, the initiation dataset may also include information such as a description of the match pool, displayed player profile data, or other information, and may be configured to cause such information to appear as an overlay on the game interface during the match (e.g., the match pool description may appear on the game interface as a reminder to the players).

Figure 6:
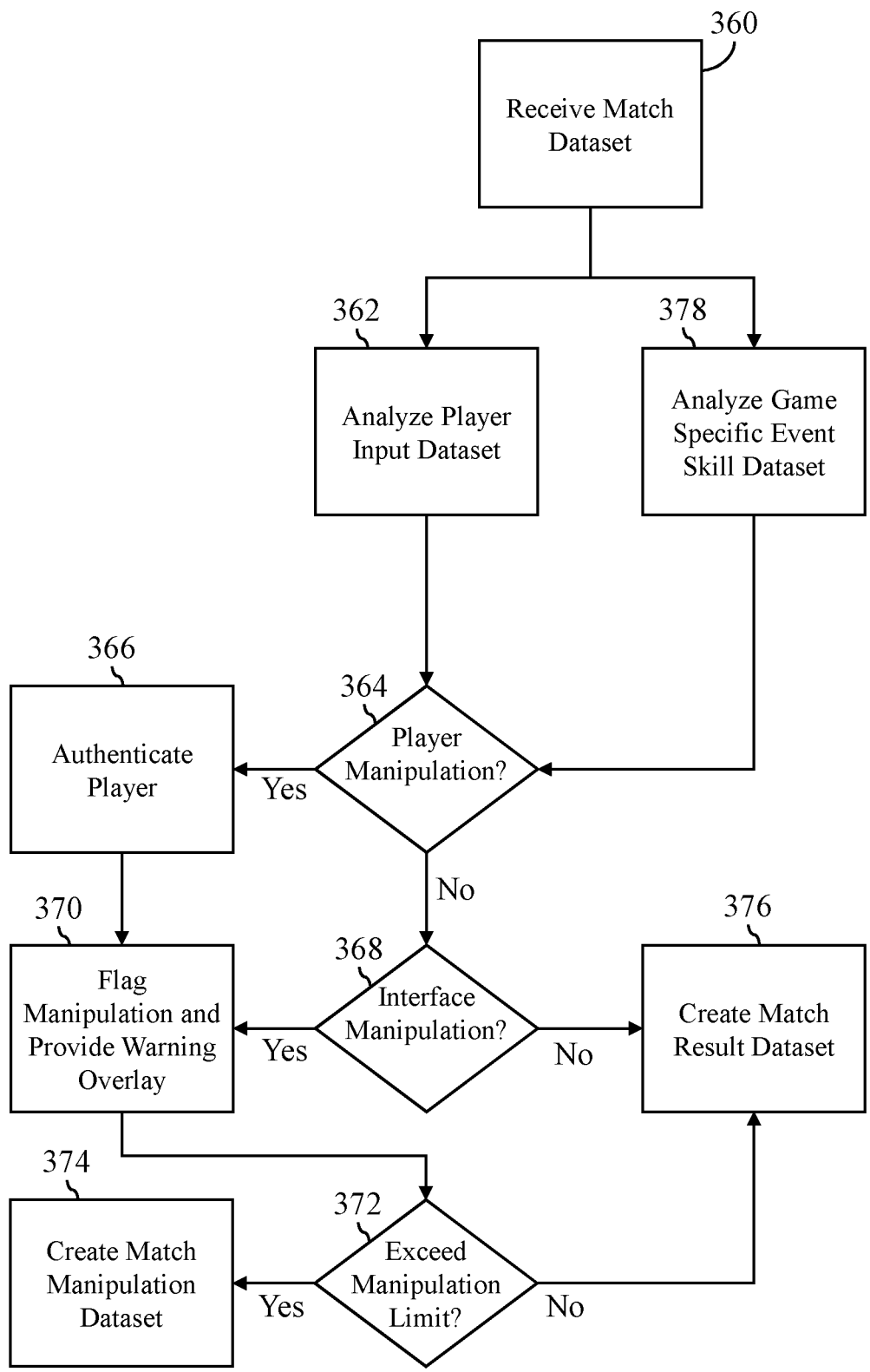
FIG. 6 is a flowchart of a set of steps that could be performed with a system to monitor a match and authenticate player inputs and activity.

While examples have been provided above, FIG. 6 provides additional examples of steps that could be performed with a system to monitor a match and authenticate player inputs and activity. During a match, the system will receive (360) a match dataset from the game server (20) and/or game devices (14). The match dataset may include, for example, match and player characteristics, such as current score or match state, and indications of certain events occurring within the match (e.g., scoring events, particular actions or maneuvers performed by a player within that match that have a specific meaning within that game), and may also include raw player input data, such as a time-indexed description of inputs provided by the player via the game controller (18).

The system may analyze (362) a player input dataset within the match dataset to determine whether any player manipulation (364) is occurring (e.g., player substitution), and whether any interface manipulation (368) is occurring (e.g., input manipulation, including use of a non-standard game controller (18), use of software to automate inputs, etc.). As has been described, analysis (362) of the player input dataset may be performed by an expert module, machine learning module or other configured analysis module capable of comparing the current player input dataset to a player's past inputs as reflected in their player profile and/or player signature. In implementations using machine learning, the machine learning function may be configured based upon training datasets of automatically annotated input data generated by and positively associated with the player, and automatically annotated input data generated by other players and/or software processes and negatively associated with the player. The machine learning function may include a plurality of sub-functions each having different training datasets, and varying implementations may have player and game specific sub-functions (e.g., a training dataset configured for one player based on their inputs to one game), player and genre specific sub-functions (e.g., a training dataset configured for one player based on their inputs to a genre of games), or player skill level sub-functions (e.g., a training dataset configured for many players of a certain player skill, based on inputs from other players of that skill).

Player manipulation (364) may be identified by the analysis (362) where the players inputs are significantly different from the expected inputs, which may include where the player is using different combinations or sequences of inputs than expected, where the time between inputs is shorter or longer than expected, or where the precision of inputs is different than expected (e.g., there are no errant inputs such as might occur from a clumsy button press, second guessing a decision, or indecision of the player). Player manipulation (364) may indicate that a player different than the account owner/player is participating in the match, and may indicate an attempt to manipulate the matchmaking system (e.g., by having a highly skilled player appear as a low skill player, and be match with other low skill players).

Interface manipulation (368) may occur when a non-standard game controller (18) is being used to provide the player an advantage, or where certain software or devices are used to provide pre-programmed and automated inputs or macro inputs to the game software (16), and may be identified based upon similar factors as above including timing between inputs (e.g., inhumanly fast inputs, inorganic time intervals between inputs), precision of inputs (e.g., lack of errant button strikes, lack of indecisive button strikes, or precise changes of inputs that are rarely seen, such as a joystick that allows for a range of directional tilt between 1 and 200, and the inputs repeatedly reflect a tilt level of exactly 75, or the inputs repeatedly change in intervals of exactly 25), and impossible inputs (e.g., directional tilt of a joystick simultaneously in opposite directions, combinations of button inputs that are rare or impossible with the human hand when using the expected game controller (18)).

Where player manipulation (364) is detected, the system may require re-authentication (366) of the player, as previously described in the context of FIG. 5. The system may require this authentication (366) after the match ends, during a normal break during the match, or may cause the game server (20) and/or game software (14) to pause the match in order to re-authenticate the player. After player manipulation (364) or interface manipulation (368) is detected, the system may flag (370) the event, and may cause a warning overlay to display within the game interface of one or more players to indicate a possible player or controller manipulation. Where the number of flagged events exceeds (372) a configured threshold, or the magnitude of irregularity shown by flagged events exceeds a configured threshold, the system may halt the match, or wait until completion of the match, and then create (374) a match manipulation dataset that describes the flagged events and all portions or relevant portions of the match dataset.

In sequence or in parallel with analyzing (362) the player input dataset, the system may also analyze a game event skill dataset included in the match dataset. While the player input dataset (362) includes raw data describing player inputs to the game controller (18) and game device (14), the game event skill dataset includes descriptions of events and occurrences that have specific meaning or context within the game associated with the match (e.g., a touchdown in a football game, a victory in card game, performance of a complex maneuver in an action game), including game scores or ratings, and have a configured association with player skill (e.g., highly skilled players will perform complex maneuvers and take advantage of certain game specific rules, while low skilled players are less likely to do so, highly skilled players will secure points or ratings at a higher rate than low skill players).

Analysis (378) of game event skill datasets may be performed similarly as described in the context of analyzing (362) the player input dataset, except that analysis of the game event skill dataset must be configured and performed within the context of the relevance of the event to each game. As an example, in an implementation using a machine learning module to analyze (378) game skill datasets, the machine learning function may be configured based upon a training dataset that is specific to one player, one game, and one event (e.g., annotated positive examples of the rate at which the player scores in the game, annotated negative examples of the rate which other players score in the game), or a training dataset for one skill, one game, and one event (e.g., the rate at which players of the same skill level as the player score, versus the rate at which players of other skill levels score). Analysis (378) of game event skill datasets proceeds based upon determinations of player manipulation (364) (e.g., the player is scoring at an irregular rate, the player is using tactics and/or causing events within the game that are irregular for that player) and interface manipulation (368) (e.g., the player is executing complex maneuvers within the game at irregular times, or with irregular precision or timing) as has been previously described.

Where no player manipulation (364) or interface manipulation (368) is detected from either analysis (362, 378), or where flagged events do not exceed (372) a configured threshold that indicates intentional manipulation, the system will instead create (376) a match result dataset when the match is complete. The match result dataset may include some or all of the match dataset, and may also include a description of the match outcome (e.g., winner, points scored, other occurrences or events specific to the game or match), as well as data that may be used as positive or negative examples within training datasets used by the analytics functions (362, 378).

Figure 7:
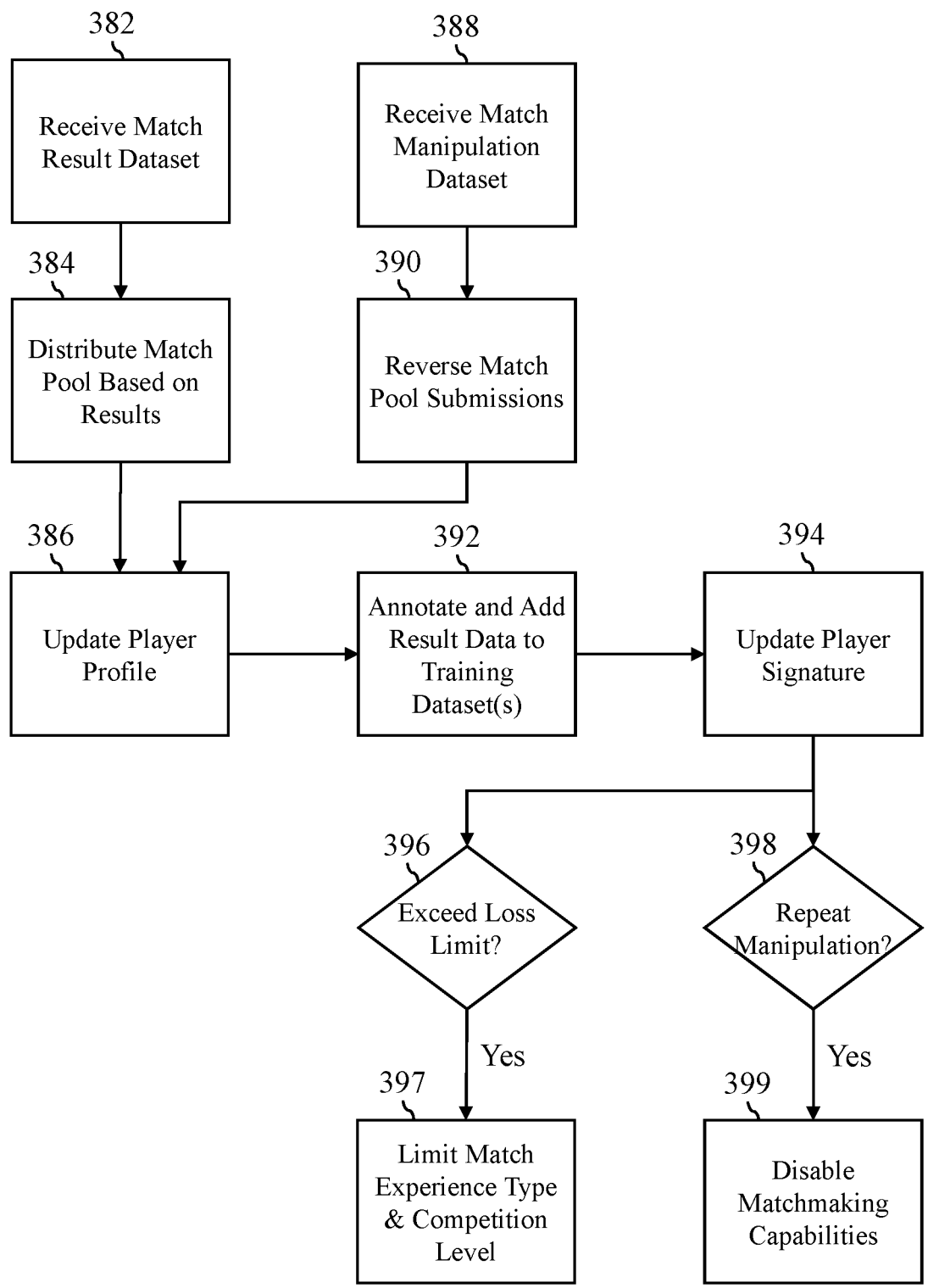
FIG. 7 is a flowchart of a set of steps that could be performed with a system to close a match and update players profiles based on results of the match.

While examples have been provided above, FIG. 7 provides additional examples of steps that could be performed with a system to close a match and update players profiles based on results of the match. Where a match result dataset is received (382), indicating that the match completed without detected manipulation, the system may distribute (384) the match pool based on the results, and may update (386) the player profile to indicate the match results, player statistics within the match, loss or gain of score, points, currency, or digital assets via distribution of a match pool, and other information. Distribution (384) of the match pool will vary by implementation, by may include effecting a transfer of score, ranking, in-game currency, or digital assets by the game server (20) or another system. Where a match manipulation dataset is received (388), indicating that significant manipulation was detected during the match, the system may reverse (390) the match pool submissions and return them to their originator, and may update (386) the player profile as described above, and further to indicate any detected and flagged manipulation events arising from the player.

The system may also annotate and add (392) result data to one or more training datasets for which the result data is relevant. Annotation may be performed automatically based upon the context of the result data, and training datasets that are affected will vary by implementation and depend upon the granularity and number of machine learning sub-functions that are used. As an example, player input data from a match where no manipulation was detected may be added to a training dataset as positive examples of that player's identity (e.g., or as positive examples of players of comparable skill), or a different training dataset as positive examples of that player's normal game controller (18) inputs (e.g., or as positive examples of inputs from players of comparable skill). Player input data from a match where manipulation was detected may beaded to training datasets as negative examples of player identity, negative examples of normal game controller (18) inputs, or otherwise as applicable. Game event skill data may be similarly used, and may be particularly relevant for game-specific training datasets where the context and meaning of the event or occurrence is retained and relevant.

The system may also update (394) the player signature, which in some cases may utilize an analytics module and training dataset that was updated (392) based upon the match results. As the players signature is updated (394) over time, their skill may increase or decrease based on the match results, and will become more unique to that player and thus more useful in positively identifying that player as part of player authentication, as has been described.

After a match closes, the system may also enforce restrictions on matchmaking based on detected manipulation, player or administrator configured limitations, or both. As an example, a player who is repeatedly (398) flagged for manipulation attempts and exceeds a configured threshold or limit may have their player profile disabled (399) for use with the matchmaking capabilities of the system for a period of time or permanently. As another example, a player profile that is associated with a configured loss limit that is exceeded (396) may have certain matchmaking features limited (397) for a period of time, or until certain other conditions are met. This may include a player configured limit on lost points, score, currency, or digital assets during a month. If this limit is exceeded, the system may prevent the player from using the matchmaking feature entirely, or may limit the player's ability to queue for matchmaking to certain configurations, such as preventing the player from queuing for a match experience type (322) as a less skilled player, or limiting the magnitude of the competition level (324) that the player queues for, as example.

Implementations of the disclosed technology provide numerous advantages including at least those described above, and also provide improvements to the technology of competitive game matchmaking and prize pooling. Technical problems suffered by conventional matchmaking include an inability to verify a players identify before matchmaking and/or during a match, an inability to detect when a prior authenticated player has changed to a different player under the same account, and an inability to detect when a player is using a non-standard game controller (18) or software to manipulate player inputs and gain an advantage. Technical solutions to these problems are disclosed above at least in the context of FIGS. 1 and 6.

Implementations of the disclosed technology also provide improvements to the efficiency and function of systems such as that disclosed in FIG. 1. The system of FIG. 1 may be configured with an architecture that distributes processing tasks, data storage, and network throughput across some or all of the matchmaking server (10), the user device (12), the game device (14), and the game server (20), and such distribution allows the system to perform complex operations in near real-time and with low latency.

As an example, in some implementations the game device (14) may be configured to perform some or all of the steps of FIG. 6 as a client device, with the match result dataset being created (376) locally and provided to the matchmaking server (10). The client device may be configured to create or receive, store, and execute analytics modules (362, 378), which may include player specific modules for the player of that device. Analytics modules may be created by the matchmaking server (10) from time to time and distributed to the game device (14) where they are based on global data, or may be created and stored by the client device, and provided to the matchmaking server (10) from time to time in case they are lost or corrupted on the client device. In this manner, the match result dataset that the client device provides to the matchmaking server (10) may also be greatly reduced in size and transmission time. Instead of trickling received match data (360) to the matchmaking server (10) throughout the match, it may be processed locally, with only relevant portions of match data being included in the match result dataset that is provided to the matchmaking server (10) upon completion of the match.

Figure 8:
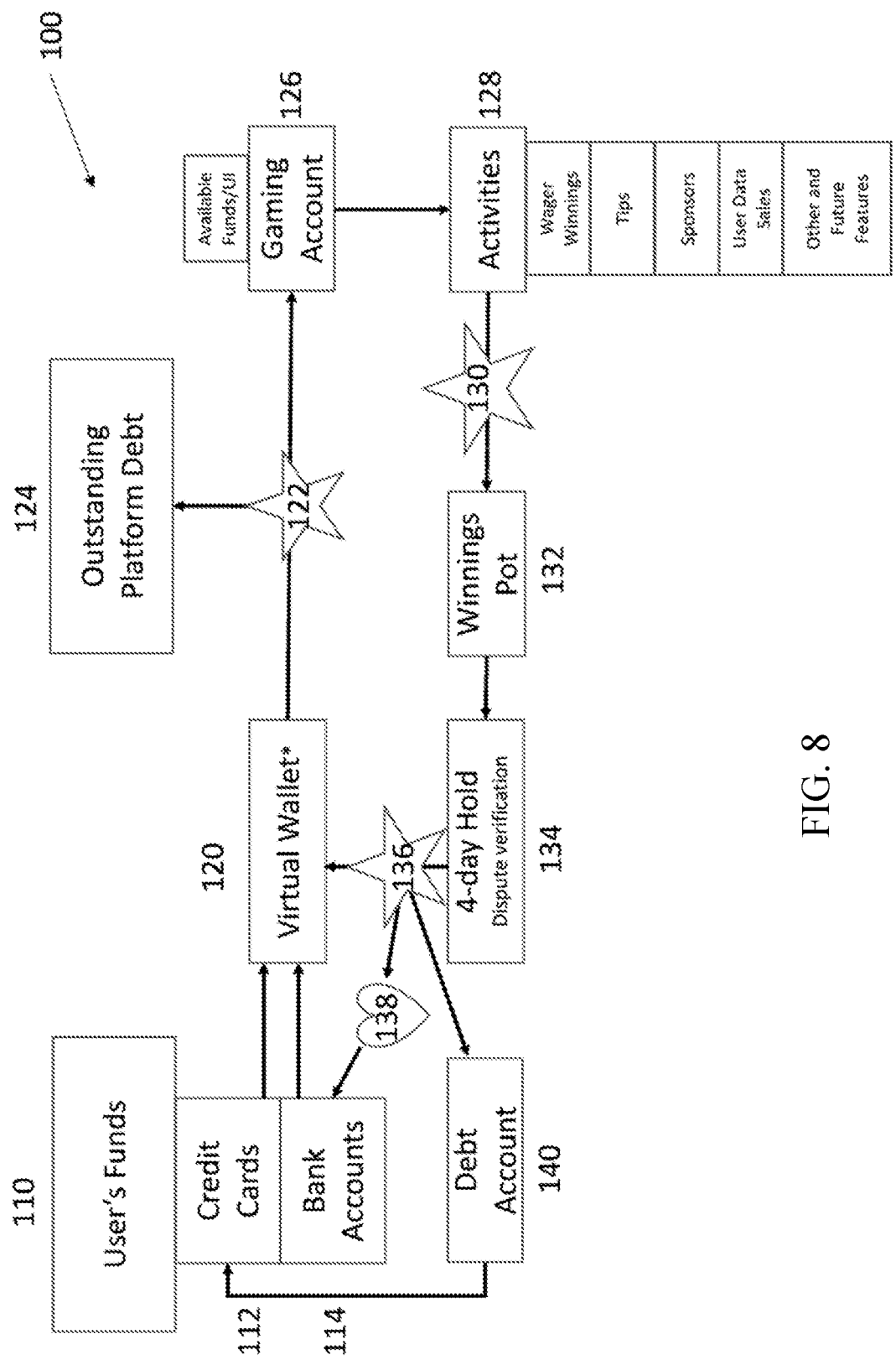
FIG. 8 is a flowchart of a set of steps that could be performed with a system to distribute a match pool based on results of the match.

FIG. 8 is a flowchart of a set of steps (100) that could be performed with a system to distribute a match pool based on results of the match. The descriptions of FIG. 8 include additional techniques and processes that may be incorporated with, or may provide additional context to, the systems, features, and steps described above in the context of FIGS. 1 through 7. A player determines his funding (110), or bankroll sources, such as credit cards (112) and/or bank accounts (114). Player sets up their virtual wallet (120). This can be an in-house solution or third-party digital wallet. This holds currency outside of their "gaming account" described below. Player connects their bankroll sources (110) to the virtual wallet (120). The system verifies the player's identity through his bank account (114 or another identify feature.

The player sets up his "gaming account" (126) with his profile and preferences or accepts default settings. Gaming account shows the funds available to wager and a player can only use settled funds to wager. The player designates how much money from each source to use to fund his gaming account. For example, this can be split by percentages. The player initiates transfer of funds from virtual wallet (120) to his gaming account (126). Third-party company such as Plaid® or a similar entity verifies funds and the system checks for any outstanding balance owed to the gaming platform (122). If an outstanding balance (124) is owed, then the balance attempts to be cleared (Original amount−Outstanding platform debt=funds transferred to the Gaming Account). If 75% (or 80%, or another specified percentage) of the balance can't be cleared, then the player journey ends. (The rest of the outstanding balance is preferably paid back with 5% of a player's winnings, per match, until fully paid off.) Funds settle in the gaming account (126).

The player may consider various activities (128) such as wager winnings, tips, sponsors, user data sales, etc. If the player chooses to wager (128), the player decides what percentage ratio of funds between bank account and credit card is used (example 75% bank account/25% credit card). The player selects wager amount and which of the four types of matchmaking they enter.

Before entering matchmaking (130), the system runs a machine learning based check to see if the player is wagering outside of his safe wagering baseline. This is done by analyzing the player's current win/loss streak over the previous several matches, comparing stress indicators in the player's vocal patterns in voice chat, and the aggressiveness of their wagering compared to their historical average. The system then decides whether the player is making irrational decisions, and if proven yes, puts a freeze on the player's account for a specified amount of time. When the freeze is over the player may resume wagering. If the player encounters consecutive freezes, then the cool off period increases in duration. The system runs a "tilt detection" check in the background to see if the player is making irrational wagering decisions. If the system finds the player is "tilted", then a freeze is put on the player's account. If tilt detection comes back normal then the player enters matchmaking.

The player plays a match. If the match is won, winnings go into player's "winnings pot" (132); if the match is not won, the player can continue playing (130) or stop playing. Before transferring funds from the "winnings pot" (132) to the gaming account (126), the system first checks to make sure there aren't any outstanding debts to a debt account (134), such as a credit card (112). Repayment to the debt account gets priority. Money currently owed to the debt account gets set aside in a non-visible "debt" account (140). The system checks to see if a credit card statement due date is within four days (136). If the credit card statement due date is within four days, money from the debt account (140) is sent to the credit card company (112).

Funds that are in excess of the amount owed on the credit card are eligible to be transferred back to the player's bank account (114) or virtual wallet (120). Funds that have completed a full cycle (138) are eligible to be deposited in the player's bank account (114). Funds in virtual wallet (120) may be converted into crypto currency. When cashing out, match winnings take four days to settle into the virtual wallet (120) before being available to be transferred to the gaming account (126), so it gives a multi-day cushion between a possible credit card statement due date and the system's mechanism to make sure the player pays back any outstanding debts used on the platform from the credit card company (112). If a player deactivates their account with an outstanding debt to either a player or the credit card company, the debt must be 75% paid before they can resume using the platform.

The system can be applied to any video game's multi-player matchmaking system to prevent cheating. It can be applied to traditional casinos to prevent gambling addiction. It can be applied to banking institutions to help new users establish both credit and responsible banking habits. The system is the first wagering payment solution to protect its players from over-extending themselves and incurring excessive wagering losses. The system's tilt detection system ensures the player is in a clear mindset when making wagering decisions. If the system finds that a player is making irrational wagering decisions, the system steps in to freeze the player's account, preventing further losses. On top of that, every six months, the system aggregates the player's net winnings per video game title. If the aggregation is $0 or negative, then the player is put on probation for that specific game title. Probation restricts the amount of money a player can wager at one time, as well as the type of matchmaking she can enter for that specific game title. If, after a specified probationary duration, the player still hasn't aggregated positive then she is no longer able to wager on that specific game title.

Transfers from a player's personal funds can be made from credit cards, miles cards, rewards cards, bank accounts, third-party online wallet, etc. to the player's digital wallet in the payment system. Preferably, the currency throughout the payment system is denominational or crypto currency. When a transfer is initiated from a credit card, this transaction is registered in the payment system. The funds in the player's digital wallet can then be transferred to the player's gaming account, however, if there are outstanding debts to the platform from the player on the player's credit card, funds will be prioritized to cover the debt first and transferred to pay down the credit card balance. For example, this occurs when a player disputes a charge from a loss and then leaves the platform without paying the debt. In one embodiment, 80% of the debt is cleared before allowing player to resume play. After that, the debt may be paid off 5% each match until the debt is fully paid off. Any additional funds above the total debt amount is transferred onward to the gaming account. For example, if a credit card is used, a player is reminded up front that, if the available funds in the third-party wallet matches or exceeds the amount of money deposited through their credit card, then the total amount deposited from his credit card will be automatically transferred and cannot be used for wagering or transferred elsewhere. Reminders can be set up to pay off credit cards from a player's available funds. The player's digital wallet account is connected to the gaming account for identification purposes and inability to defraud the system. Sometimes, players create new accounts to avoid debts; the present invention utilizes methods to prevent or minimize this practice by using identify verification such as a bank account, a player's social security number, etc.

The funds in the gaming account can then be used for activities (like spending money on the in-game platform via microtransactions or putting wagers on games). Any winnings from wagers, tips received from other people on the platform, sponsorship money, sales of player data, and/or any other future features which generate currency for players that do not come from the player's digital wallet, are put in a sub-account within the gaming account called the winnings pot. Any money entering the winnings pot is put on a limited, specific, time hold where it can be used for activities but not transferred out of the winnings pot account to the player's digital wallet. Payments are held for a specified amount of time before a transfer goes through to the player's digital wallet. For example, funds may be held for four days (in order to verify the player's credit card statement date and clear outstanding balances used on the platform), during which those winnings pot funds can be used for further game wagering. In one embodiment, a feature allows the player to build credit over time by maintaining a small debt.

Once the hold expires, the money is eligible to be transferred back to the player's digital wallet. The player may choose to transfer the money out or keep it in the winnings pot and use it within the platform. However, upon initiation of any transfer from the winnings pot it will first be determined if there are any debts occurring from previous credit card deposits into the player's digital wallet. If there is a credit card debt, any transfer of money from the winnings pot will go toward paying off the credit card. Any funds exceeding the debt may then be transferred to the player's digital wallet.

The system may facilitate transfers between two or more players' digital wallets, for instance, when a wager is placed between two players. A wager, or agreed upon amount, is pre-authorized from each player's digital wallet. The pre-authorization shows up visibly in the digital wallet although no change of hands of money has yet occurred. In one embodiment, the player interface on the player's wallet looks like the funds were transferred, however, in reality, the funds will not be transferred until the match is validated, in order to make the dispute process seamless. This way, an unsatisfied player who disputes a wager will think he is getting his money refunded, when in reality, the wagering platform never took the money in the first place because the match was not yet validated. In one embodiment, one or more players affected may not play any additional matches for money until the dispute is resolved. In another embodiment, the wagering platform may hold the disputed funds in escrow until the dispute is resolved, which will allow the players to continue playing matches with the players' other funds.

If a player does not have sufficient funds to cover the wager, then the player may not wager. Once a game is finished and the result is validated, the pre-authorization hold is released on the winner's account, and the transfer of money from the loser's account is initiated. The transfer from the loser's account is divided in two streams: the first stream is the cut that goes to the wagering platform, and the second stream is the winnings that go to the winner's winnings pot account.

The system is purpose-built to help players make money doing what they love (playing games), while protecting their best interests. The present invention comprises flexible payment options that allow players to be paid in either fiat currency or cryptographic currency. This gives players the option to use the system as a viable job by paying in fiat or an investment opportunity by paying in cryptographic currencies. Either way, the choice is going to be theirs. The present invention has a built-in safeguard that requires a player to pay back any money wagered using a credit card before she can withdraw her winnings. This safely builds credit score while leveraging credit card perks. In addition, by directly connecting a credit card to pay game fees, on top of a player's match winnings, they can earn bonus points, for instance airline miles. In addition, with the payment of that credit card's statement, they increase their credit score.

The system doesn't take money out of a player's account until a match winner is validated. Instead, the payment system rolls back the balance on the player's available funds (from the player interface) without actually touching the money until validation. That allows the payment system to seemingly "instant transfer" the money back into the player's account in the event of a dispute and provide the player a hassle-free experience.

In one embodiment, if a player abandons an account with an outstanding balance due to a dispute, the platform covers the debt, and the money must be at least 80% paid back before the player can resume using the platform. The player may work off the rest of the debt by paying the platform 5% out of the "account delinquent" player's winnings per match, until the debt is cleared. This may be coupled with a process that starts by limiting players to wagering small amounts of money. As the player's skill/rank becomes higher, the system will allow him to wager larger sums of money. If a player leaves the platform with an outstanding balance, he's signaled that he no longer intends to use the platform.

The system may comprise an identity feature, wherein the platform ties the player account to an identity provider such as social security number or a bank's identity provider solution in order to make sure players can only have a single wagering player account. This also eliminates an industry term called "smurfing": the act of creating a new account to intentionally play brand-new players. A side benefit of incorporating an identity feature into the platform is making sure players don't abandon their accounts with platform debt, only to create a new, unrestricted account. It also incrementally gets rid of hackers. If a player is tied to a single account via an identity feature, and that account is caught cheating and subsequently banned, the platform can ban that player from creating a new account and rejoining the platform.

The system may comprise a machine-learning "tilt detection system". This may, for instance, be created from and fed by player wagering data. This system comprises an algorithm to analyze individual player wagering patterns over time and detect when a player is making irrational decisions when it comes to how aggressively he is wagering. This tilt detection system comprises one or more of the following data inputs: frequency of play, wager amount, vocal stress patterns, and consecutive match losses. In the wagering industry, the mindset when making irrational wagers due to the factors listed above is called being "tilted" or "on tilt." The present system detects the early stages of being on tilt, and from there may send warnings to the player and/or the gaming platform or other interested party, or, the system may freeze the player's account for a specified amount of time. Once the player is able to resume wager matches, if the system still detects the same player is tilted, then the "cool off" time is increased.

In addition to utilizing one or more of the above-described features to create a gaming system that increases player confidence in the gaming company, features such as match-making and scheduling may be utilized. It may be useful to play someone known to be a better or worse skilled than you. Playing someone known to be worse than curtails your risk as a player. There is a benefit to having players know where they stand in relation to other players. For instance, some players may wish to play someone worse than them because it mathematically skews the odds of winning in their favor. On the other hand, some players may wish to play someone better than them because they have a chance to win bigger money and/or learn new skills. In some embodiments, matchmaking features can allow a player to play people marginally worse than themselves (e.g., for a smaller payout). The matchmaking process begins when a player enters into the matchmaking user interface on a game platform. The first set of parameters to be set is whether the player chooses automatic or manual matchmaking.

Under the automatic matchmaking feature, two variables are populated based on a player's history of playing their chosen game: skill and team cohesion. Skill is determined through three designations. First, a player is given a designation as a Rising Star when her rank increases by more than a certain number of places over a specific time period. Second, a player is given a designation as a Difference Maker when his performance (which is game specific, an example in a simple first-person shooter game would be the ratio of kills/deaths/assists) relative to his teammates, as well as the opposing teams, is better than a certain percentage of the players (regardless of win/loss history). Third, roles that are identified by game and game mode are assigned and subcategorized by play style within that role. An example, again taken from first-person-shooter and king-of-the-hill modes, is a general role like a Scout (e.g., who stays in one area guarding a highly powerful weapon) or a Rusher (e.g., who leads an invasion) who can be subcategorized into different levels of aggressiveness.

The second variable, team cohesion, is taken into consideration when utilizing automatic matchmaking, which is defined as the history of win/loss(/tie) with each other individual that they are currently grouped up with. The higher the win ratio, with more players on the team, increases the team cohesion ranking. Once skill and team cohesion have been determined, the matchmaking process determines if a specific role or play style is missing from the currently grouped players. Any missing role and/or play style is searched for among other currently matchmaking players and the closest match is invited to join the group.

Under the manual matchmaking feature, any and all specific aspects of the automatic matchmaking system are able to be toggled in the matchmaking user interface. Additionally, players can intentionally play higher-ranked players by choosing to only match with opponents a certain percentage better than themselves and their team. This results in a certain percentage increase in entry fee, which is paid at the completion of matchmaking before loading into the start of the match. Players can also intentionally play lower-ranked players by choosing to only match with opponents a certain percentage worse than themselves and their team. This results in a certain percentage decrease in entry fee, which is paid at the completion of matchmaking before loading into the start of the match.

Reaching the top tier of players in a given game changes the matchmaking system to no longer consider rank placement. The top tier is a pool of players comprising a certain percentage of the total number of monthly players, broken down on role and play style. The system has at all times a certain number of players with certain roles and play styles and counts as the professional tier of the game and play mode. Within the top tier, players are able to directly challenge other top tier players and pay an additional entry fee to regular matchmaking wager. Players not in the top tier can directly challenge players that are within a specific range of number of ranks above and below their own rank.

The system may also comprise a scheduling feature. The scheduling feature allows matches between players and/or teams as well as any other events such as practices to be scheduled for certain days and times and synchronizes with any calendar that players add through the matchmaking user interface. At the end of a match, validation is required from all players before a payout is initialized, not validating a game result within 24 hours leads to a strike, where three strikes lead to a suspension. Players report the win/loss state of their team to the automated validation system. The reports are also verified by an end of match screenshot of the match results, which are compared to players' reports.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A system comprising one or more processors and:
    (a) a database configured to store a plurality of player profiles, wherein each player profile comprises a plurality of match result datasets and is uniquely associated with a player; and
    (b) a software interface configured to communicate with a game platform, wherein the game platform comprises one or both of:
        (i) a game software configured on a plurality of game devices; and
        (ii) a game server configured to manage multiplayer matches for the game software;
    wherein the one or more processors are configured to:
    (i) for each of the plurality of player profiles, create a player signature based on the plurality of match result datasets for that profile, wherein the player signature describes for the player associated with that profile:
        (A) a skill level for the game software; and
        (B) patterns of activities performed with the game software;
    (ii) receive a plurality of queue requests associated with the plurality of player profiles, wherein each queue request comprises a match experience type, wherein the plurality of queue requests comprises at least a first queue request from a first player and a second queue request from a second player;
    (iii) pair the first queue request with the second queue request based on a correspondence between the skill level of the first player and the match experience type of the second queue request, and a correspondence between the skill level of the second player and the match experience type of the first queue request; and
    (iv) using the software interface, provide a match initiation dataset to initiate a match between the first player and the second player and, during the match, receive a match dataset; and (v) using an authentication function and based on the match dataset and the player profile of any player, flag the match for manipulation if:
  (A) the authentication function determines that a player substitution has occurred; or
  (B) the authentication function determines that an input manipulation has occurred.

2. The system of claim 1, wherein the one or more processors are further configured to, after pairing the first queue request with the second queue request, cause a pre-match interface to display on a display of a first user device associated with the first player and a display of a second user device associated with the second player.

3. The system of claim 2, wherein the pre-match interface is configured to receive a set of match configuration inputs from the first player and the second player, and the one or more processors are configured to provide the set of match configuration inputs to the game platform as part of the match initiation dataset, wherein the set of match configuration inputs are configured to alter an initial state of the match from a pre-configured default state.

4. The system of claim 2, wherein:
  (a) the pre-match interface is configured to receive a pool submission from each player, and to display and update a match pool based on received pool submissions, wherein each pool submission describes one or more digital assets; and
  (b) the one or more processors are configured to:
    (i) receive a match result dataset, wherein the match result dataset describes the outcome of the match; and
    (ii) distribute the match pool to one or more player profiles based on the match result dataset.

5. The system of claim 4, wherein the one or more processors are configured to:
  (a) receive a match manipulation dataset, wherein the match manipulation dataset describes a match manipulation detected by the authentication function; and
  (b) reverse the pool submission to one or more player profiles based on the match manipulation dataset.

6. The system of claim 4, wherein the one or more processors are configured to:
  (a) determine a match pool requirement for each of the first player and the second player based on the skill level of the first player and the second player, wherein the match pool requirement:
    (i) describes the one or more digital assets that are required in the pool submission of that player; and
    (ii) corresponds to a difference in the skill level of that player and the other player;
  (b) cause the pre-match interface update the display of the match pool based on the match pool requirement for each of the first player and the second player; and
  (c) only provide the match initiation dataset to initiate the match after the match pool requirement for each player has been met.

7. The system of claim 1, wherein the one or more processors are configured to cause a queuing interface to display on a display of a first user device associated with the first player, wherein the queuing interface is configured to:
  (a) display a plurality of match experience types, comprising an equal skill match type, a player skill disadvantage match type, and a player skill advantage match type; and
  (b) receive a user selection of one of the plurality of match experience types, and provide the match experience type of the first queue request based on the user selection.

8. The system of claim 7, wherein the one or more processors are configured to, where the match experience type of the first queue request is:
  (a) the equal skill match type, pair the first queue request with the second queue request based on the skill level of the first player being within a pre-configured threshold of the skill level of the second player;
  (b) the player skill disadvantage match type, pair the first queue request with the second queue request based on the skill level of the first player being outside the pre-configured threshold and less than the skill level of the second player; and
  (c) the player skill advantage match type, pair the first queue request with the second queue request based on the skill level of the first player being outside the pre-configured threshold and greater than the skill level of the second player.

9. The system of claim 1, wherein the one or more processors are configured to, prior to providing the match initiation dataset to initiate the match:
  (a) provide a player authentication request to a first user device associated with a first player profile of the plurality of player profiles that is associated with the first player;
  (b) receive a player authentication response from the first user device and, where the player authentication response is valid, provide the match initiation dataset to initiate the match.

10. The system of claim 9, wherein the one or more processors are configured to, after the authentication function determines that the player substitution has occurred:
  (a) provide a mid-match player authentication request to the first user device associated with the first player profile;
  (b) receive a mid-match player authentication response from the first user device and, where the mid-match player authentication response is valid, determine that the player substitution did not occur, and do not flag the match for manipulation.

11. The system of claim 9, wherein:
  (a) the player authentication request comprises one or both of a two-factor authentication request and a biometric authentication request;
  (b) the first user device is uniquely associated with the first player profile, such that the first user device is the only device to which the player authentication request can be provided, and the only device from which the player authentication response can be received; and
  (c) the first user device is one of a smartphone associated with the first player profile, or a game device associated with the first player profile.

12. The system of claim 1, wherein:
  (a) the authentication function comprises a machine learning function that is configured to compare the player profile for that player to the match dataset to identify irregularities in that player's skill level or performed activities in the match;
  (b) the machine learning function is configured based upon one or more training datasets;
  (c) the one or more processors are configured to update the one or more training datasets to include automatically annotated positive and negative examples selected from historic match datasets that are received during prior matches.

13. The system of claim 1, wherein the one or more processors are configured to:
   (a) identify a player input dataset in the match dataset, wherein the player input dataset comprises a time indexed sequence of raw inputs received from a game device on which the first player is participating in the match;
   (b) use the authentication function to compare the time indexed sequence of raw inputs to historic raw inputs associated with the player profile for that player to identify irregularities in the timing, sequence, and precision of the time-indexed sequence of raw inputs; and
   (c) where irregularities are identified, determine that the input manipulation has occurred.

14. The system of claim 1, wherein the one or more processors are configured to:
   (a) identify a game event skill dataset in the match dataset, wherein the game event skill dataset comprises a time indexed sequence of game events that resulted from activities of the first player during the match;
   (b) use the authentication function to compare the time indexed sequence of game events to historic game events associated with the player profile for that player to identify irregularities in the occurrence of game events; and
   (c) where irregularities are identified, determine that the player substitution has occurred.

15. The system of claim 1, wherein the one or more processors comprise a first processor of a matchmaking server and a second processor of a game device on which the first player is participating in the match, and wherein:
   (a) the second processor is configured to:
      (i) receive the match dataset during the match;
      (ii) receive a first player profile associated with the first player from the matchmaking server;
      (iii) use the authentication function to determine whether the player substitution or the input manipulation has occurred;
      (iv) provide an indication of the results of the authentication function to the matchmaking server; and
      (v) provide the match result dataset to the matchmaking server;
   (b) the first processor is configured to:
      (i) flag the match for manipulation based on the indication of the results of the authentication function;
      (ii) update the first player profile and the authentication function based on the match result dataset; and
      (iii) provide an updated first player profile and an updated authentication function to the game device.

* * * * *